United States Patent [19]

Hayman

[11] Patent Number: 5,005,877
[45] Date of Patent: Apr. 9, 1991

[54] QUICK CONNECT/DISCONNECT FLUID COUPLING

[75] Inventor: Lawrence F. Hayman, Auckland, New Zealand

[73] Assignee: Parker Hannifin Corporation, Cleveland, Ohio

[21] Appl. No.: 446,948

[22] Filed: Dec. 6, 1989

[30] Foreign Application Priority Data

Dec. 16, 1988 [NZ] New Zealand ............. 277363

[51] Int. Cl.⁵ ............................. F16L 37/22
[52] U.S. Cl. ............................. 285/315; 285/317; 285/321
[58] Field of Search ............ 285/308, 315, 316, 34, 285/317

[56] References Cited

U.S. PATENT DOCUMENTS

| | | |
|---|---|---|
| Re. 27,635 | 5/1973 | Kopaska . |
| 1,509,651 | 9/1924 | Eftiger . |
| 2,092,116 | 9/1937 | Hansen ............. 285/315 X |
| 2,225,610 | 12/1940 | Christian ........... 285/315 X |
| 2,304,390 | 12/1942 | Wolfram . |
| 2,318,965 | 5/1943 | Parker et al. . |
| 2,322,877 | 6/1943 | Parker . |
| 2,344,740 | 3/1944 | Shaff ............. 285/316 X |
| 2,706,646 | 7/1951 | Olson . |
| 2,823,934 | 2/1958 | Gorrell et al. . |
| 3,163,178 | 12/1964 | Stratman . |
| 3,398,977 | 8/1968 | Yoneda . |
| 3,431,942 | 3/1969 | Kopaska . |
| 3,490,491 | 1/1970 | Kopaska . |
| 3,498,641 | 3/1970 | Bohlen . |
| 3,530,887 | 9/1970 | Stratman . |
| 3,561,472 | 2/1971 | Lamb et al. . |
| 3,592,231 | 7/1971 | Lamb . |
| 3,646,964 | 3/1972 | Stratman . |
| 3,666,300 | 5/1972 | Russell . |
| 3,758,137 | 9/1973 | Kershaw . |
| 3,788,348 | 1/1974 | Johnson . |
| 3,826,523 | 7/1974 | Eschbaugh . |
| 3,831,984 | 8/1974 | Kutina . |
| 4,216,982 | 8/1980 | Chow ................. 285/315 |
| 4,222,411 | 9/1980 | Herzan et al. . |
| 4,240,466 | 12/1980 | Herzan et al. . |
| 4,543,994 | 10/1985 | Johnson et al. . |
| 4,583,711 | 4/1986 | Johnson . |
| 4,660,803 | 4/1987 | Johnston et al. . |
| 4,702,278 | 10/1987 | Badoureaux . |
| 4,723,797 | 2/1988 | Veryat . |
| 4,850,622 | 7/1989 | Suzuki .............. 285/308 X |

OTHER PUBLICATIONS

Aeroquip Engineeering Bulletin AEB 185 Aeroquip Corporation.

Primary Examiner—Dave W. Arola
Attorney, Agent, or Firm—Ralph E. Jocke

[57] ABSTRACT

A quick connect/disconnect coupling for hydraulic or pneumatic conduits has a male half (4) and a female half (2) each of said halves having fluid bores therethrough. Split ring segments 7 are arranged in ring within the female coupling half and are movable therein. The ring segments are biased towards the centerline of the coupling by an elastic o-ring (9). When the coupling halves are engaged, the ring segments are positioned between a radially extending shoulder (6) on the male coupling half and a radially extending shoulder (21) on the female coupling half. In the engaged and locked position of the coupling halves, the ring segments in blocking relation with the shoulders holds the coupling halves together. The ring segments are in abutting relation with adjacent ring segments on either side when the coupling halves are in the engaged in locked position. The male coupling half includes a tubular releasing member (10) slidably mounted thereon. When the releasing member is moved in the direction of the female coupling half a tapered surface (18) of the releasing member moves the ring segments radially outward above the shoulder on the male coupling half and enables the coupling halves to be disconnected.

9 Claims, 3 Drawing Sheets

QUICK CONNECT/DISCONNECT FLUID COUPLING

TECHNICAL FIELD

This invention relates to couplings for making hydraulic and pneumatic connections. Particularly this invention relates to quick connect/quick disconnect couplings for pneumatic and hydraulic fluid lines.

BACKGROUND ART

Many types of pneumatic and hydraulic fluid couplings have been devised over the years. The purpose of these couplings is to connect and disconnect fluid lines of various types and to conduct fluids at various pressures. Examples of prior art type fluid couplings are found in U.S. Pat. Nos.: 4,723,797; 4,702,278; 4,583,711; 4,543,994; 4,240,466; 4,222,411; 3,831,984; 3,826,523; 3,788,348; 3,758,137; 3,666,300; 3,646,964; 3,592,231; 3,561,472; 3,530,887; 3,498,641; 3,490,491; 3,431,942; 3,163,178; 2,706,646; 2,322,877; 2,318,965; 2,304,390; Re. 27,635.

Although all of the above couplings are improvements over the then existing prior art, there are certain features that are desired for couplings in virtually all applications. One such feature is ease of engagement. In many couplings tools are required to effect connection and disengagement. In other couplings, tools are not required, but it is necessary to manipulate awkward mechanisms before the coupling halves will engage. In other couplings it is necessary to apply excessive pressure to force the couplings together before the coupling halves will engage. Likewise, when it is necessary to disengage the coupling, excessive pressure or awkward manipulations may be required.

Other couplings have the disadvantage that the coupling halves must be aligned in a particular orientation before they will engage. This prevents the coupling halves from swiveling with respect to each other which is often desired in making fluid connections. Other coupling designs have parts that wear out due to repeated coupling and uncoupling as well as the effects of high loading conditions due to the pressure of the fluid carried by the coupling.

It is almost universally desirable that a coupling once connected, be locked together in a reliable fashion and be highly resistant to the leakage of fluid.

Thus there exists a need for a fluid coupling for joining hydraulic or pneumatic fluid lines which may be readily connected and disconnected without awkward manipulations or the use of tools, is capable of being connected in any orientation and swiveling, is positively locked when engaged, is resistent to wear and is inexpensive to produce.

DISCLOSURE OF INVENTION

It is an object of the present invention to provide a coupling for hydraulic or pneumatic lines that is easy and quick to engage.

It is a further object of the present invention to provide a coupling for hydraulic or pneumatic lines which is easy and quick to disengage.

It is a further object of the present invention to provide a coupling for hydraulic or pneumatic lines that does not require tools to effect connection or disconnection.

It is a further object of the present invention to provide a coupling for hydraulic or pneumatic lines that is fully swiveling due to radial symmetry.

It is a further object of the present invention to provide a coupling for hydraulic or pneumatic lines that provides positive locking of the coupling halves when in the engaged position.

It is a further object of the present invention to provide a coupling for hydraulic or pneumatic lines that is resistant to high separating loads caused by fluid pressure.

It is a further object of the present invention to provide a coupling for hydraulic or pneumatic lines that is suitable for use in high pressure, pulsing and vibratory environments.

It is a further object of the present invention to provide a coupling for hydraulic or pneumatic lines that is resistant to wear.

It is a further object of the present invention to provide a coupling for hydraulic and pneumatic lines that is less expensive to produce than existing couplings.

Further objects of the present invention will be made apparent in the following Best Modes for Carrying Out Invention and the appended claims.

The foregoing objects are accomplished by a quick connect/disconnect coupling for hydraulic and pneumatic lines. The coupling has a male half and a female half with collinear fluid bores therethrough. A plurality of split ring segments are arranged in a loop within the female coupling half and are movable thereon. The ring segments are biased towards the centerline of the coupling by an elastic o-ring. When the coupling halves are engaged in locked position, the ring segments are positioned between a shoulder on the male coupling half and shoulder on the female coupling half. Positioning the ring segments in blocking relation between the shoulders locks the coupling halves together. The ring segments are sized to be in abutting relation with adjacent ring segments on each side when the coupling halves are engaged and locked. This adds strength to the coupling.

The male coupling half has mounted thereon a movable tubular releasing member. The releasing member includes a tapered surface. When the releasing member is moved in the direction of the engaged female coupling member, it contacts the ring segments. The tapered surface of the releasing member moves the ring segments radially outward so they are no longer in abutting relation with the shoulder on the male coupling half. Once the ring segments are moved to clear the shoulder, the coupling halves may be pulled apart.

The coupling halves are joined together by inserting the male coupling half into the female coupling half. A tapered surface on a leading edge of the male coupling half engages the ring segments and moves them radially outward as the male coupling half is inserted. Once the extending shoulder passes the ring segments, the ring segments drop behind the shoulder to lock the coupling halves in engagement.

BEST MODES FOR CARRYING OUT INVENTION

Figure 1:
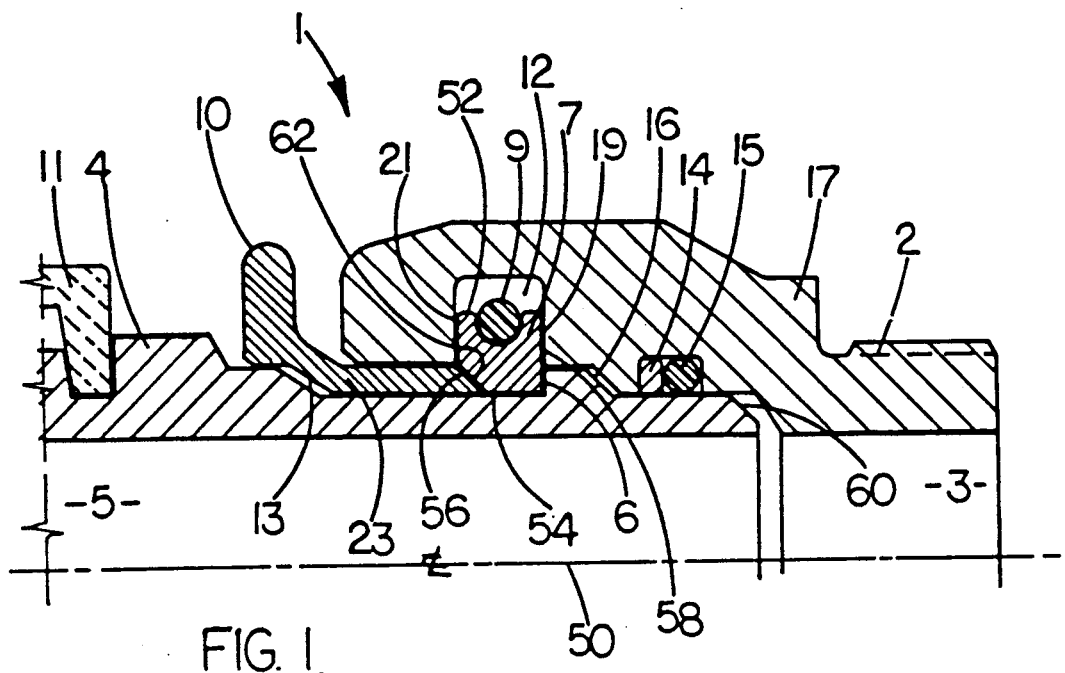
FIG. 1 is a partial cross sectional view of the preferred form of the coupling of the present invention in the engaged and locked position.

Referring now to the drawings and particularly to FIG. 1 there is shown therein a coupling for hydraulic or pneumatic conduits generally indicated 1. The coupling includes a female coupling half 2 having a fluid bore 3 therethrough and a male coupling half 4 having a fluid bore 5 therethrough. The male coupling half 4 is engageable within the female coupling half 2 with the fluid bores 3 and 5 arranged along a common centerline 50.

A first radially extending shoulder 6, which serves as a first locking surface, extends about the periphery of male coupling half 4. A second shoulder 21, which serves as a second locking surface, extends radially within female coupling half 2.

Figure 3:
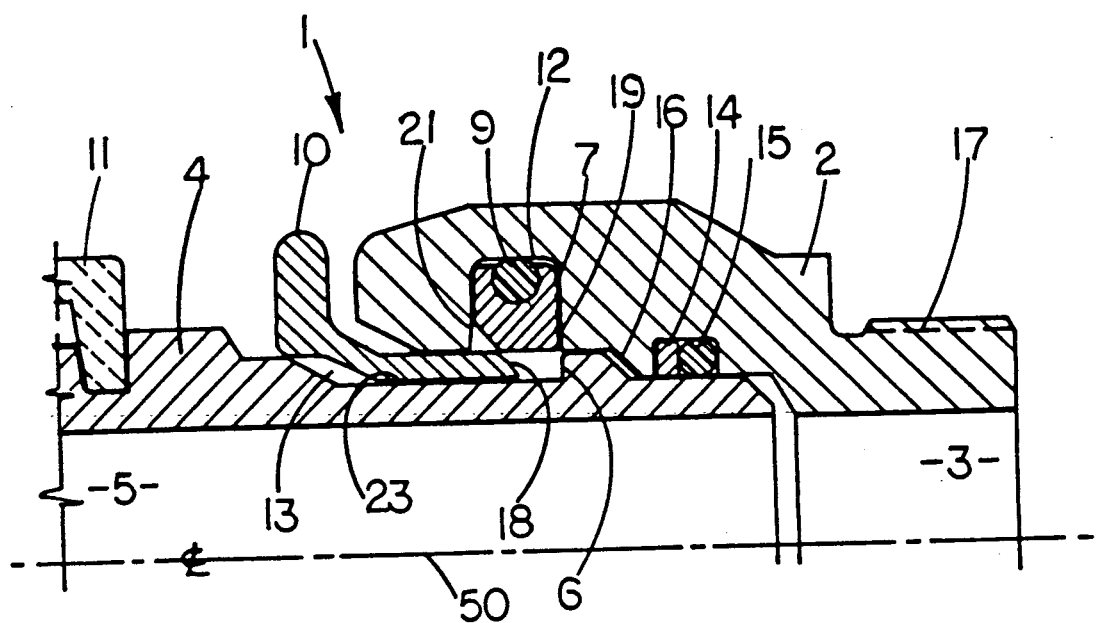
FIG. 3 is a partial cross sectional view of the coupling in the releasing position so the coupling halves may be disengaged.

A plurality of locking bodies 7 are mounted within female coupling half 2. The construction and arrangement of the locking bodies is such that they form a substantially closed ring dimensioned and configured to fit between the locking surfaces 6 and 21 when the coupling halves 2 and 4 are locked and engaged. The locking bodies 7 are moveable between a release position shown in FIG. 3, in which annular shoulder 6 may be moved past locking bodies 7 so that the coupling halves may be disengaged. In the engaged and locked position shown in FIG. 1 the locking bodies are positioned in blocking relation between shoulders 6 and 21 to prevent relative axial movement of the female and male coupling halves and maintain the coupling in engagement.

Figure 2:
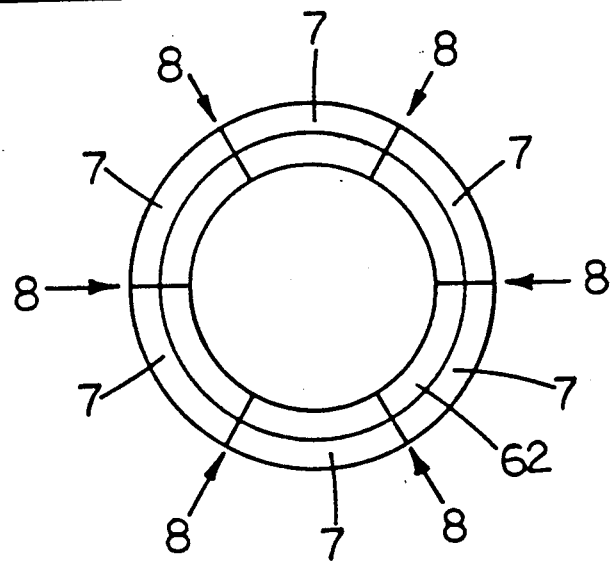
FIG. 2 is an end view of the split ring segments of the coupling shown in FIG. 1.

The locking bodies 7 in the first embodiment are segments of a split collet ring shown in FIG. 2. the ring is comprised of segments wich are split at points around its circumference as indicated by arrows 8 so as to form ring segments. In other embodiments of the invention, the locking bodies may comprise balls, rollers or bodies having other shapes. As shown in FIGS. 1 and 2, the ring segments which comprise locking bodies 7 are substantially rectangular in cross section. The ring segments are so arranged that first sides 52, 54 of the ring segments at any given point on the ring are in cross section substantially parallel to the centerline 50 extending through the center of the coupling. Second sides of the ring segments 56, 58 are in cross section substantially perpendicular to centerline 50.

The locking bodies 7 are retained in a common annular radially sided channel 12 in female coupling half 2. The locking bodies are substantially free to slide within channel 12. Ideally, each locking body is brought in contact with or at least close proximity to, the adjacent locking bodies on each side in the split ring when the coupling is in the engaged and locked position. The substantial abutment of each locking body with at least one other locking body serves to prevent deformation of the locking bodies and to maintain the couplings in their engaged position. The surface area provided by the ring segments is also helpful in distributing large forces that may be applied to the coupling by fluid pressure.

An elastic o-ring 9 is provided about the outer periphery of the locking bodies 7. O-ring 9 serves as biasing mens to bias the bodies 7 radially inward against the male coupling half. Preferably the o-ring is retained in a groove (not separately shown) in first sides 52 of the locking bodies.

The coupling also includes a tubular releasing member 10. Releasing member 10 includes a ramped face 18 which is adjacent to the locking bodies 7 when the coupling halves are in engagement. Releasing member 10 serves as movement means for the locking bodies and is operable to move the bodies radially outward against the force of the elastic o-ring. In other embodiments of the invention, a radiused outer edge may be used in place of ramped face 18. It has been found that a radiused edge also works satisfactorily and is easier to manufacture.

The releasing member 10 includes a flanged portion 23 which, is passed over the end of the male coupling half 4 during assembly and is swaged into a recess 13. As a result, the releasing member is captive on the male half but is slidable in the axial direction.

The female coupling half includes a ring seal 15 and an anti-extrusion ring 14 positioned between the male and female coupling halves when they are in engagement. These items serve to seal the coupling halves in fluid tight relation. The ring seal and anti-extrusion ring are located adjacent to a threaded end 17 of the female coupling when the coupling halves are assembled. The male half also has a tapered edge 60 to facilitate insertion of the coupling halves. The male coupling half also includes a ferrule 11 to facilitate attachment to a fluid conduit.

To connect the couplings, the male coupling half 4 is inserted into the female coupling half 2 to place the fluid bores 3 and 5 in communication. As the male coupling half is inserted, a tapered leading edge 16 ahead of shoulder 16 contacts the locking bodies 7 and displaces them radially outward into the relase position shown in FIG. 3. When the male coupling half is fully inserted into the female coupling half 2, the vertical surface of shoulder 6 ia aligned with a side surface 19 of channel 12 in the female half. The locking bodies then to move radially inward due to the force exerted by the o-ring, into the locking position shown in FIG. 1. In this position, the locking bodies, which it will be remembered are ring segments, are positioned between shoulders 6 and 21 to prevent relative movement of the coupling halves in the axial direction. The elastic o-ring 9 further serves to keep the locking bodies in the locking position to prevent the coupling halves from separating. The coupling halves may swivel with respect to one another while in the engaged and locked position.

The engaged and locked coupling halves may be used for example, as part of a hydraulic or pneumatic transmission line or even as a quick release mechanical coupling. If the coupling is subjected to a separating force resulting from internal pressure or external tension, the locking bodies 7 act as stops to prevent separation of the coupling halves. The load exerted on the coupling due to high fluid pressure is transferred from shoulder 6 through the locking bodies to the female coupling half via shoulder 21 and enables the coupling of the present invention to resist higher separating loads compared to other designs.

When it is desired to disengage the coupling halves, the releasing member 10 is moved towards the female coupling half 2. In this position, a tapered edge 18 of the releasing member is moved against locking bodies 7. The tapered edge 18 of the releasing member engages a similarly tapered ring surface 62 on the locking bodies. Movement of the releasing member causes the locking bodies to be displaced outward to the release position. Once the locking bodies are in the release position and are no longer in engagement with shoulder 6, the coupling halves may be removed from engagement without the use of tools.

It can be seen that the invention provides a hydraulic, pneumatic or mechanical coupling which has the advantage that it is easy and quick to engage and disengage. Engagement may be effected by a "snap fit" by pushing the male coupling half into the female coupling half. No tools, excessive manipulation or unreasonable force is required. Once alignment is achieved and the coupling halves are pressed together, the locking bodies automatically move into locking position.

When disengagement of the coupling halves is desired, it is necessary only to press the releasing member on the male coupling half as this will achieve the effect of displacing the locking bodies sufficiently to release the coupling halves. In addition, when the coupling halves are engaged, they are fully swiveling due to the radial symmetry and freely slidable locking bodies of the coupling.

It is a further advantage of the invention that the split collet ring segments which are the locking bodies, provide a large area of contact between the male and female coupling halves. This increases the load carrying capacity of the coupling. The large contact surface offered by the generally square cross sectional profile of the locking bodies further enables the coupling to sustain relatively high separating loads and to be used in high pressure, pulsing and vibratory environments. This aspect also serves to reduce or eliminate the damage and wear to the coupling which would otherwise result from use in such environments.

Figure 4:
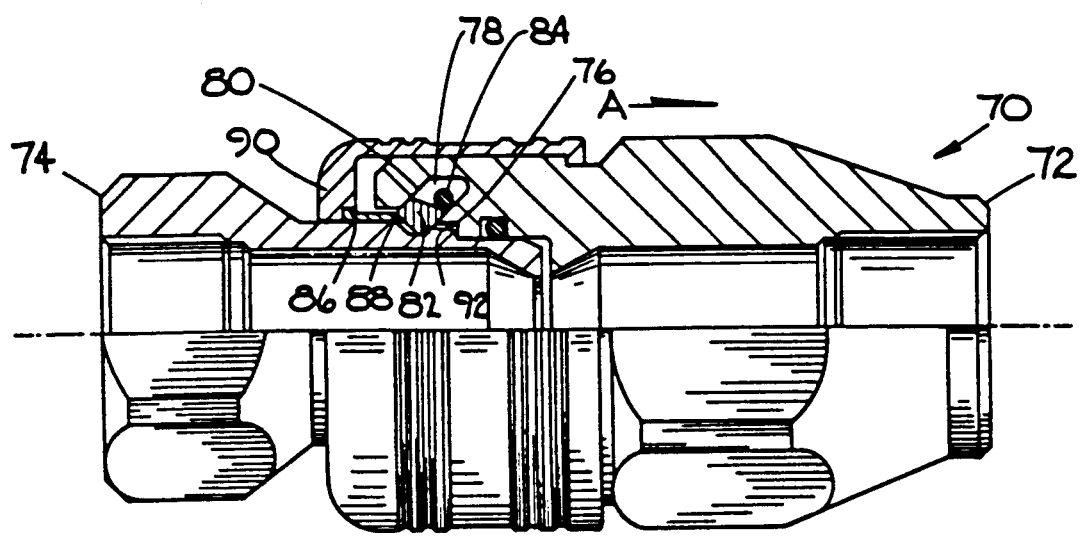
FIG. 4 is a partial, cross sectional view of an alternative embodiment of the present invention.
Figure 5:
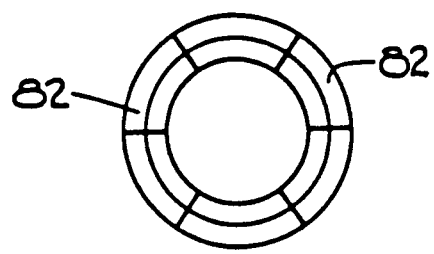
FIG. 5 is an end view of the split ring segments of the alternative embodiment shown in FIG. 4.

An alternative embodiment of the coupling of the present invention in the engaged and locked position, generally indicated 70, is shown in FIG. 4. Coupling 70 is similar in many aspects to the first embodiment and includes a female coupling half 72 and an interfitting male coupling half 74. An angled shoulder 76 extends outwardly at a first angle from the male coupling half relative to the centerline of the coupling and serves as a first locking surface. Female coupling half 72 includes an angled channel 78 which also extends at the first angle, and has an inward extending shoulder 80 which serves as a second locking surface. A plurality of locking bodies 82 are mounted on female coupling half 72. The locking bodies 82 form a substantially closed ring dimensioned to fit between the locking surfaces 76 and 80. The locking bodies 82, in cross section, are a five sided polygons. As shown in FIG. 5, locking bodies 82 are segments of a split collet ring. When the coupling halves are in the engaged and locked position, the ring segments are in substantially abutting relation with each adjacent ring segment. As was discussed with reference to the first embodiment, this feature provides enhanced load carrying capability that achieves other advantages of the invention.

The locking bodies 82 are biased radially inward toward the male coupling half by an elastic o-ring 84. The elastic o-ring 84 extends about an outer periphery of the locking bodies.

A releasing ring member 86 is mounted on the female coupling half 72. Releasing ring member 86 includes a tapered edge 88 which is normally in contact with a face of locking bodies 82. Member 86 is mounted on a release sleeve 90. Sleeve 90 is mounted for movement longitudinally on female coupling half 72. Sleeve 90 is crimped or otherwise retained so it will not separate from the female coupling half.

Release sleeve 90 includes a cylindrical portion which extends longitudinally and in contact with an outer surface of female coupling half 72. The release sleeve also includes a leg portion which is of integral one piece construction with the cylindrical portion. The leg portion extends inward to adjacent the male coupling half 74. This construction of release sleeve 90 resists outward deformation of the female coupling half which may be result from high separating loads, and adds to the strength of the coupling.

When the coupling halves are to be disengaged from the engaged and locked position shown in FIG. 4, sleeve 90 is moved in the direction of arrow A. This causes the releasing member 86 to move in a similar direction and edge 88 to apply force on locking bodies 82. As a result of the applied force, the locking bodies move upward in channel 78 against the force of the elastic o-ring 84. Further movement of the locking bodies causes such bodies to move above locking surface 76 which enables the coupling halves to be separated.

When it is desired to lock the coupling halves together from a separated condition, the halves are moved into interfitting relation. A tapered leading edge 92 engages the locking bodies and moves them upward as the halves are pressed together. Once the locking bodies move past surface 76, they fall inward in channel 78 under the force of o-ring 84, again placing the coupling halves in the engaged and locked position shown in FIG. 4.

In the preferred form of the invention the angled channel 78 extends at a first angle of 45° relative to the centerline of the coupling. The angled channel presents several advantages over the prior art. The axial separating load between the coupling halves is carried by the locking bodies at 45° so that at second locking surface 80, half the force is reacted axially and half is reacted radially. The radial component of the reacting force tends to move the locking bodies inwards toward the male coupling half. This aids in holding the halves together.

Other advantages of the angled channel is the greater ease with which the male coupling half moves the locking bodies outward when the male coupling half is inserted into the female coupling half. This is because the force applied to the locking bodies is aligned with the direction that the bodies move. Release of the coupling halves is easier for the same reason. The angled channel 78 is also easier to machine in the inside surface of the female coupling half and allows the coupling half to be made as a single piece. This provides greater strength and reduces the cost associated with multiple piece assemblies.

Thus, the invention achieves the above stated objectives, eliminates difficulties encountered in the use of prior devices, solves problems and obtains the desirable results described herein.

In the foregoing description, certain items have been used for brevity, clarity and understanding, however no unnecessary limitations are to be implied therefrom because such terms are used for descriptive purposes and are intended to be broadly construed. Moveover the descriptions and illustrations given are by way of examples and the invention is not limited to the exact details shown or described. Having described the features, discoveries and principles of the invention, the manner in which it is constructed and operated and the advantages and useful results obtained, the new and useful structures, devices, elements, arrangements, parts, combinations, systems, equipment, operations and relationships are set forth in the appended claims.

I claim:

1. A quick connect/disconnect coupling having two engageable and disengageable haves, said halves being locked together when in engaged relation, comprising:

a male coupling half having a first fluid bore therethrough, said male coupling half having a generally cylindrical outside surface and including a first locking surface extending outward relative to a centerline of the coupling, said first locking surface extending circumferentially about said male coupling half;

a female coupling half having an opening and a second generally cylindrical fluid bore therethrough for accepting said male coupling half, said outside surface of said male coupling half extending into said opening when said halves are in engaged relation, said female coupling half including a body portion having a second locking surface extending circumferentially in said second fluid bore, said second locking surface extending inward and at an acute angle relative to the centerline of the coupling and a plane of said opening, said first and second bores in fluid communication when said coupling halves are in engagement, said body portion further including a cylindrical outer surface extending parallel of the centerline of the coupling;

a plurality of cocking bodies mounted for movement outward from the centerline of the coupling on one of said coupling halves, each of said locking bodies comprising an arcuate segment of a ring, and in the engaged position of said coupling halves each of said locking bodies engaging said first and second locking surfaces and both adjacent locking bodies in said ring; and biasing means for biasing said ring segments toward said centerline of said coupling; and movement means for moving said locking bodies to disengage at least one of said locking surfaces, whereby said coupling halves are enabled to be disconnected; and wherein said movement means includes a sleeve member mounted for movement parallel of the centerline of the coupling on said female coupling half, said sleeve member including a cylindrical portion having an inner face, said inner face of said cylindrical portion overlying and contacting said outer surface of said body portion of said female coupling half and extending circumferentially about said outer surface; said sleeve member further including a turned-in continuous leg portion, said cylindrical portion and said leg portion of unitary, one piece construction, said leg portion extending from said cylindrical portion of said sleeve member to adjacent said outside surface of said male coupling half.

2. The coupling according to claim 1 wherein said second locking surface is a shoulder on said female coupling half and said locking bodies are movable in a direction parallel of said shoulder on said female coupling half.

3. The coupling according to claim 2 wherein said locking bodies are mounted on said female coupling half and said ring segments are five sides polygons in cross section.

4. The coupling according to claim 3 wherein said first locking surface is a shoulder extending outward of the centerline of said coupling about a periphery of said male coupling half and generally parallel of the shoulder on female coupling half, and said movement means is operable to move said locking bodies outward beyond said shoulder on said male coupling half to enable disconnection of said coupling halves.

5. The coupling according to claim 4 wherein said male coupling half includes a ramped face adjacent said shoulder whereby when said coupling halves are moved together from said disconnected position said ramped face engages said ring segments and said segments move thereon outward against the force of said biasing means to enable said shoulder on said male coupling half to pass said ring segments, and after said shoulder passes said ring segments to engage said shoulder to lock said halves in locked engagement.

6. The coupling according to claim 1 wherein said movement means comprises a releasing member mounted on said female coupling half, said releasing member including a locking body engaging surface for engaging said ring segments and moving them against the force of said biasing means whereby said coupling halves may be disconnected.

7. The coupling according to claim 6 wherein said releasing member is movable generally in a direction parallel of the centerline of said coupling, and said locking body engaging surface includes a tapered edge whereby movement of said releasing member towards said ring segments causes said releasing member to engage said segments and move them outward.

8. The coupling according to claim 7 wherein said ring segments include an outwardly tapered ring surface adjacent said releasing member whereby said tapered edge of said releasing member engages said tapered ring surface of said ring segments.

9. The coupling according to claim 7 wherein said biasing means is an elastic o-ring.

* * * * *

UNITED STATES PATENT AND TRADEMARK OFFICE
CERTIFICATE OF CORRECTION

PATENT NO. : 5,005,877
DATED : April 9, 1991
INVENTOR(S) : Lawrence F. Hayman

It is certified that error appears in the above—identified patent and that said Letters Patent is hereby corrected as shown below:

Claim 1, Column 7, Line 35 the word "cocking" should be "locking".

Claim 3, Column 8, Line 14, the word "sides" should be "sided".

On the title page, item [73] should read
--Parker Enzed (N.Z.) Limited
Auckland, New Zealand--.

Signed and Sealed this

Sixth Day of October, 1992

Attest:

DOUGLAS B. COMER

*Attesting Officer*  *Acting Commissioner of Patents and Trademarks*